United States Patent [19]

Johnston et al.

[11] Patent Number: 5,004,575

[45] Date of Patent: Apr. 2, 1991

[54] PREPARING COMPOSITE MATERIALS FROM MATRICES OF PROCESSABLE AROMATIC POLYIMIDE THERMOPLASTIC BLENDS

[75] Inventors: Norman J. Johnston, Newport News; Terry L. St. Clair, Poquoson; Robert M. Baucom, Newport News; John R. Gleason, Hampton, all of Va.

[73] Assignee: The United States of America as represented by the Administrator of the National Aeronautics and Space Administration, Washington, D.C.

[21] Appl. No.: 262,268

[22] Filed: Oct. 21, 1988

Related U.S. Application Data

[63] Continuation-in-part of Ser. No. 105,846, Oct. 8, 1987, abandoned.

[51] Int. Cl.$^5$ .................. B29C 67/14; C08G 73/14
[52] U.S. Cl. .................. 264/136; 264/257; 264/331.12; 525/432; 528/352; 528/350
[58] Field of Search ............. 525/432, 928; 528/352, 528/350; 264/331.12, 257, 136, 135, 134, 138

[56] References Cited

U.S. PATENT DOCUMENTS 4,066,631  1/1977  Dimmig ........................... 528/530
4,107,125  8/1978  Lovejoy .......................... 525/432
4,468,506  8/1984  Holub ............................. 525/432
4,530,993  7/1985  Jinda .............................. 528/352
4,695,610  9/1987  Egli ................................ 525/426
4,765,942  8/1988  Christensen .................. 264/331.12

OTHER PUBLICATIONS

"High Heat Polyimides are Easier to Process Now", Modern Plastics; Summers et al, Apr. 1989, pp. 126-131.

Primary Examiner—Jay H. Woo
Assistant Examiner—Jeremiah F. Durkin, II
Attorney, Agent, or Firm—George F. Helfrich; Harold W. Adams; John R. Manning

[57] ABSTRACT

Composite materials with matrices of tough, thermoplastic aromatic polyimides are obtained by blending semi-crystalline polyimide powders with polyamic acid solutions to form slurries, which are used in turn to prepare prepregs, the consolidation of which into finished composites is characterized by excellent melt flow during processing.

4 Claims, 10 Drawing Sheets

FIG.7b EDGE-200X
FIG.7d TOP SURFACE-2000X
FIG.7a EDGE-100X
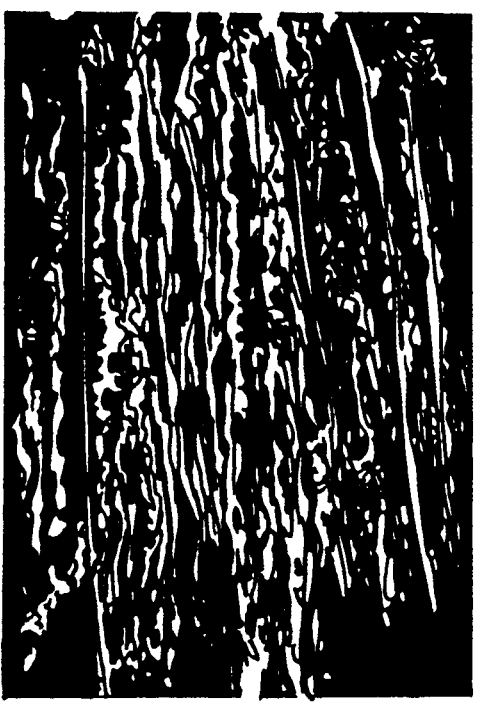
FIG.7c TOP SURFACE-200X

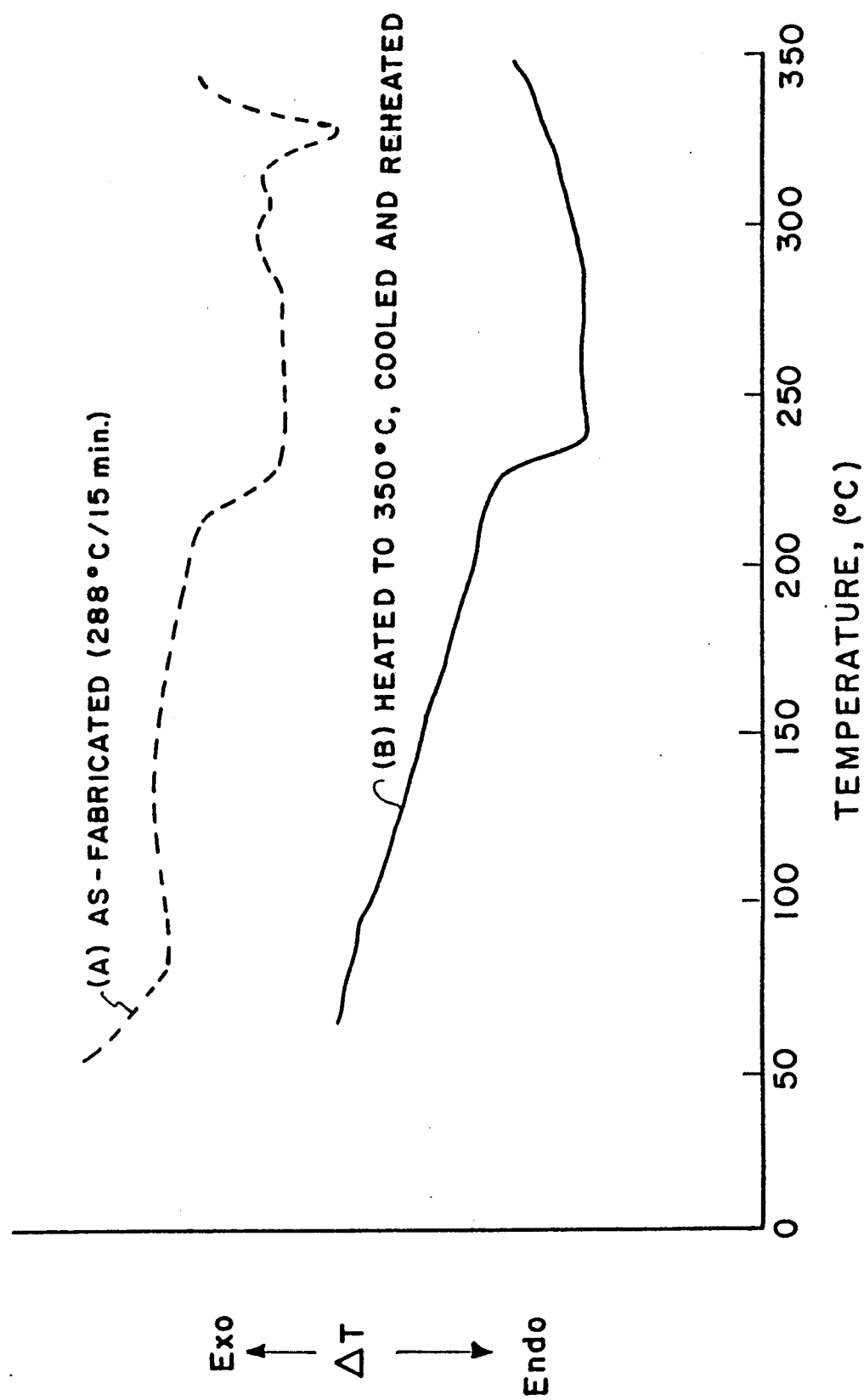

PREPARING COMPOSITE MATERIALS FROM MATRICES OF PROCESSABLE AROMATIC POLYIMIDE THERMOPLASTIC BLENDS

ORIGIN OF INVENTION

The invention described herein was made by employees of the United States Government and may be manufactured and used by or for the Government for governmental purposes without the payment of any royalties thereon or therefor.

This application is a continuation-in-part of our co-pending application Ser. No. 105,846, filed Oct. 8, 1987 now abandoned.

BACKGROUND OF THE INVENTION

1. Field of the Invention

This invention relates generally to composite materials.

This invention relates particularly to the preparation of composite materials wherein the matrix materials are tough aromatic thermoplastic polyimides that exhibit unusually low viscosities during the application of heat.

2. Prior Art

Polyimides are attractive to the aerospace industry because of their toughness, thermal and thermooxidative stability, solvent resistance and excellent mechanical and electrical properties over a wide temperature range. However, processing of these materials has been difficult due to limited melt flow during the application of heat and pressure. It has been shown that the substitution of aliphatic segments into aromatic polyimides results in the reduction of the softening temperature of modified polyimide polymers; however, the thermooxidative stability of the system was comprised. V. L. Bell et al utilized meta-substituted aromatic diamines in the preparation of homopolyimides, which rendered the polymer thermoplastic at low temperatures and moldable at moderate to high pressures. Adhesive and film forms of these polymers were also developed, as well as resins suitable for impregnation of carbon fibers. However, the production of structurally sound, void-free laminates from prepregs was difficult due to the poor melt flow characteristics exhibited during processing.

SUMMARY OF THE INVENTION

It is accordingly the primary object of the present invention to provide what has been heretofore unobtainable in the prior art, viz., a process for preparing tough aromatic thermoplastic polyimides which exhibit excellent melt flow characteristics—i.e., low viscosities—during processing. This object is achieved, and the disadvantages of the prior art are obviated, by the provision of a process wherein semi-crystalline polyimide powders are blended with polyamic acid solutions to form slurries, which in turn are used to prepare prepregs, the consolidation of which into finished composites is characterized by excellent melt flow during processing.

BRIEF DESCRIPTION OF THE DRAWINGS

For a more complete understanding of the present invention, including its primary object and benefits, reference should be made to the Detailed Description of the Invention set forth below. This Detailed Description should be read together with the accompanying drawings, wherein:

FIGS. 7A, 7B, 7C, and 7D are drawings made from scanning electron micrographs of the edge and top surfaces of a prepreg fabricated from a 2:1 slurry of the LARC-TPI polyimide powder and polyamic acid;

FIG. 8 shows DSC curves of a unidirectional composite made from a 2:1 combination of LARC-TPI polyimide powder and polyamic acid;

DETAILED DESCRIPTION OF THE INVENTION

Polyimides

Figure 1:
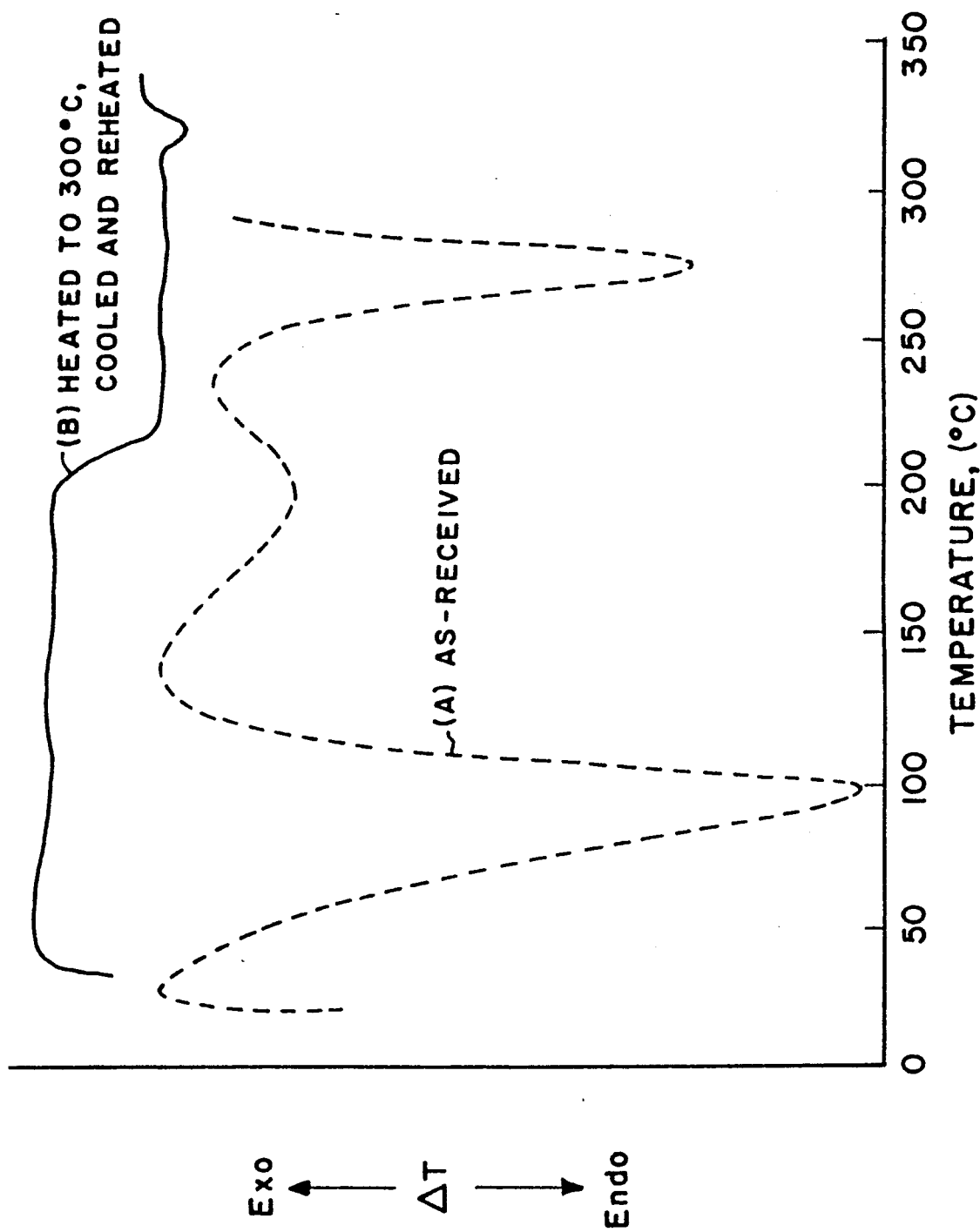
FIG. 1 shows DSC curves of a polyimide powder denominated LARC-TPI.

Polyimides are prepared from the reaction of dianhydrides, I, with aromatic diamines, II, to form polyamic acids, III, which are cyclodehydrated to the corresponding aromatic polyimide, IV. Classes of dianhydrides applicable to this invention are as follows:

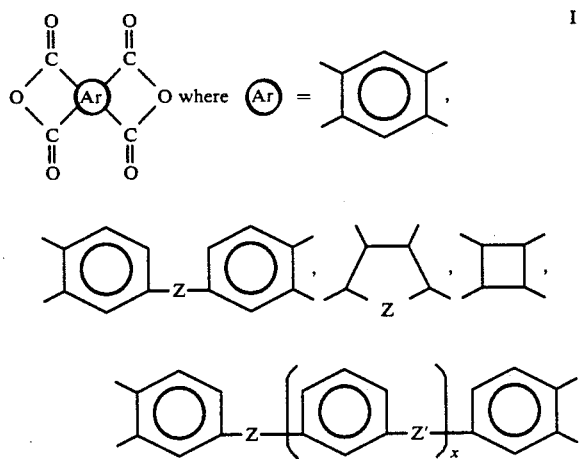

and Z and Z' are selected from among the following:
O, S, $CH_2$, R—C—R, $SO_2$, O=C, R—$S_i$—R
where
R=$CH_3$, $C_6H_5$, $CF_3$
and
X=0, 1, 2.

Classes of aromatic diamines applicable to this invention are as follows:
$H_2N$—Ar'—$NH_2$ where

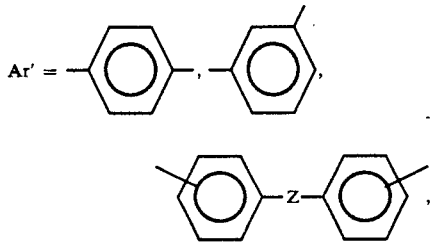

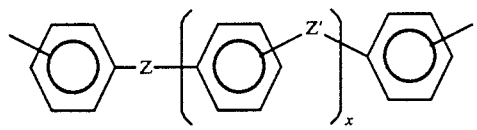

and Z and Z' are selected from among the following:

O, S, CH₂, R—C—R, SO₂, R—S$_f$—R where

R=CH₃, DF₃, C₆H₅ and

X=0, 1, 2 and isomer variations include ortho, meta, and para substitution.

High molecular weight linear polyamic acid solutions are prepared from among aprotic solvents such as dimethylformamide and dimethylacetamide, protic solvents such as meta-cresol, and ether solvents such as diglyme and diethylcellosolve. Ether solvents are preferred since they are easily removed during processing. The generic formula for the polyamic acid is as follows:

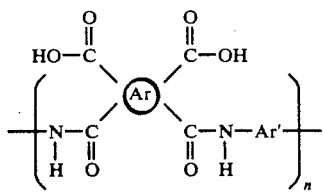

These polyamic acids are thermally or chemically cyclodehydrated to the corresponding polyimide:

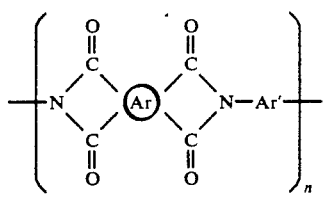

High molecular weight aromatic polyimides are difficult to fabricate into shaped articles, except at very high temperatures and pressures, because of their poor melt-flow characteristics. For example, a composite made from polyimide V, hereinafter called LARC-TPI, and AS-4 carbon fiber exhibited poor consolidation and poor flexural and short beam shear properties as shown in Table I below, after being processed at temperatures up to 350° C. (662° F.) and pressures up to 300 psi. The composite also exhibited a poor ultrasonic C-scan indicating that it was filled with voids due to poor melt flow and consolidation.

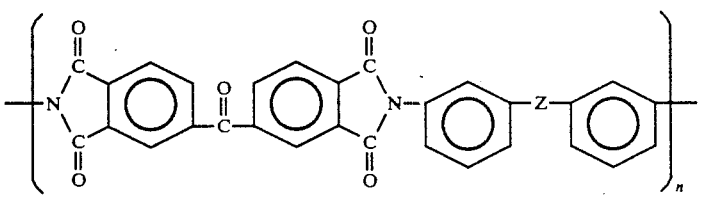

V:Z=O=C
VI:Z=SO₂

TABLE I
SHORT BEAM SHEAR AND FLEXURE PROPERTIES OF AS-4/LARC-TPI COMPOSITES

| Test temp., °C. (°F.) | SBS, Strength Ksi | Flex., Strength Ksi | Flex., Modulus Msi |
|---|---|---|---|
| LARC-TPI* | | | |
| RT | 9.2 | 137 | 12.8 |
| 93 (200) | 8.8 | 121 | 12.6 |
| 149 (300) | 8.4 | 111 | 11.1 |
| 177 (350) | 7.8 | 99 | 12.1 |

*50% fiber vol., Tg 253–258° C., C-scan poor

Semicrystalline Polyimide Powders

Semicrystalline polyimide powders of generic structure IV are prepared by the chemical cyclodehydration of polyamic acids in various aprotic solvents. Dehydrating agents are acetic anhydride and cyclohexylcarbodimide, among others. The powders applicable to this invention possess the following properties:

percent crystallinity: between 10 and 50 percent;

melting point: in the range from 100° C. to 350° C.;

inherent viscosity: less than 1.0 dl/g in dimethylacetamide or m-cresol;

molecular weight: between 5,000 and 50,000 grams/mole;

melt viscosity: $10^2$–$10^4$ poise at 300–350° C.;

capable of step-growth polymerization to tough high molecular weight polymer;

exhibit no crystallinity after thermal exposure above 325° C.;

particle size: less than the diameter of the fiber where polymer is being utilized as a matrix material for fabrication of continuous filament-reinforced composites.

In practice, because the insolubility of polyimides precludes a direct measurement of molecular weight, the number average molecular weight is estimated using the Mark-Houwink relationship between intrinsic viscosity and molecular weight:

$[\eta] = KM\alpha$

K and $\alpha$ = Constants for a particular solvent system
M = Molecular weight
$[\eta]$ = Intrinsic viscosity Semicrystalline powders applicable to this invention must have a low melt viscosity, usually obtained by controlled molecular weight, yet on thermal exposure will increase in molecular weight by slow chain growth polymerization of the amine and anhydride end groups to form a tough linear thermoplastic material.

Polymer Blends

The semicrystalline polyimide powder is added to a 10–40 percent solution of the high molecular weight polyamic acid. Ether solvents are preferred, although others can be employed. The powder must remain insoluble. Depending upon the amount of melt flow improvement desired, the ratio of the polyimide powder to polyamic acid can vary from 1:10 to 10:1. The total solids content can vary from 20 to 50 percent, by weight. The resultant slurry must be stable and not separate into its components if it is to be employed in prepregging fiber or fabric in continuous processes. Typical slurries used to prepreg continuous carbon fiber tow are given in Table II. In compositions labeled I, both the polyamic acid and the semicrystalline powder were derived from LARC-TPI, V. In compositions labeled II, the polyamic acid was a polyimidesulfone, VI, while the semicrystalline powder was LARC-TPI. Ratios of powder to amic acid included 2:1, 1:1, and 1:2.

TABLE II

| COMPOSITION OF TYPICAL PREPREGGING SLURRIES | | | |
|---|---|---|---|
| Component | PI:PAA = 2:1 | 1:1 | 1:2 |
| I | | | |
| LARC-TPI 29.4% soln. | 500 | 550 | 800 |
| Diglyme | 500 | 550 | 437 |
| LARC-TPI PI powder | 294 | 162 | 118 |
| % Solids, w/w | 34 | 26 | 26 |
| II | | | |
| PISO$_2$ 18% soln. | — | — | 1200 |
| LARC-TPI PI powder | — | — | 108 |
| % Solids, w/w | — | — | 25 |

The slurry is applied to film, fiber, fabric, metal, polymer or composite surfaces, depending upon the desired use. After a B-stage heat treatment to remove solvent and water of imidization, a polymer coating is obtained which has the semicrystalline powder homogeneously dispersed on the substrate in the polyimide derived from the polyamic acid. Thermal imidization above the melt point of the semicrystalline powder with or without the application of pressure causes enhanced melt-flow of the blend of the two polyimides. Melt viscosity builds as the polyimide derived from the semicrystalline powder increases in molecular weight.

EXAMPLES

EXAMPLE 1

A 30 percent (w/w) LARC-TPI polyamic acid solution was prepared in diglyme by the addition of one mole of solid 3,3'4,4'-benzophenone tetracarboxylic acid dianhydride (BTDA) with stirring to a solution of one mole of 3,3'-diaminobenzophenone. This solution is also obtainable from Mitsui Toatsu Chemicals, Inc. Inherent viscosity was 0.5 dl/g in DMAc at 35° C. for 0.5 percent solution. The corresponding LARC-TPI polyimide powder was prepared by addition of excess acetic anhydride to a dimethylacetamide solution of the polyamic acid. The powder precipitated from solution with stirring as a fine cream-colored talc. It is also obtainable from Mitsui Toatsu Chemicals, Inc.

DSC curves of this powder are shown in FIG. 1. The as-received untreated powder, curve A, exhibited strong endotherms at 100° C. and 175° C., indicative of removal of water and solvent. The sharper endotherm at 275° C. is the crystalline melt. After being heated to 300° C. and cooled, the material exhibited curve B on reheating. A strong endotherm at 205° C. represents the Tg of the low molecular weight amorphous material in the powder. The weak endotherm at 320° C. represents a second crystalline melt which did not reappear when the sample was taken to 350° C., cooled, and reheated.

Figure 2:
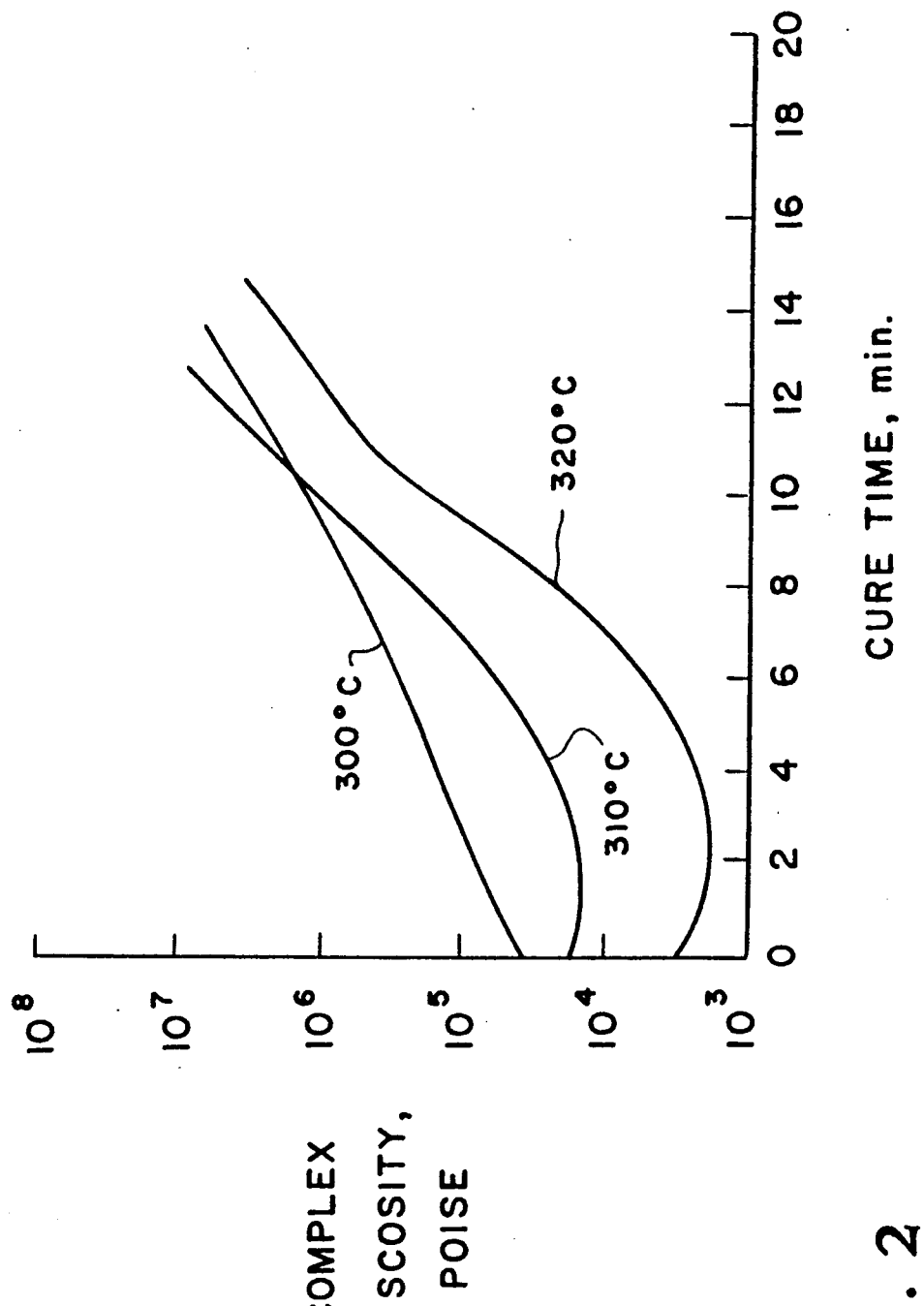
FIGS. 2 and 3 are plots of complex viscosity vs. cure time for the LARC-TPI polyimide powder at various temperatures.
Figure 3:
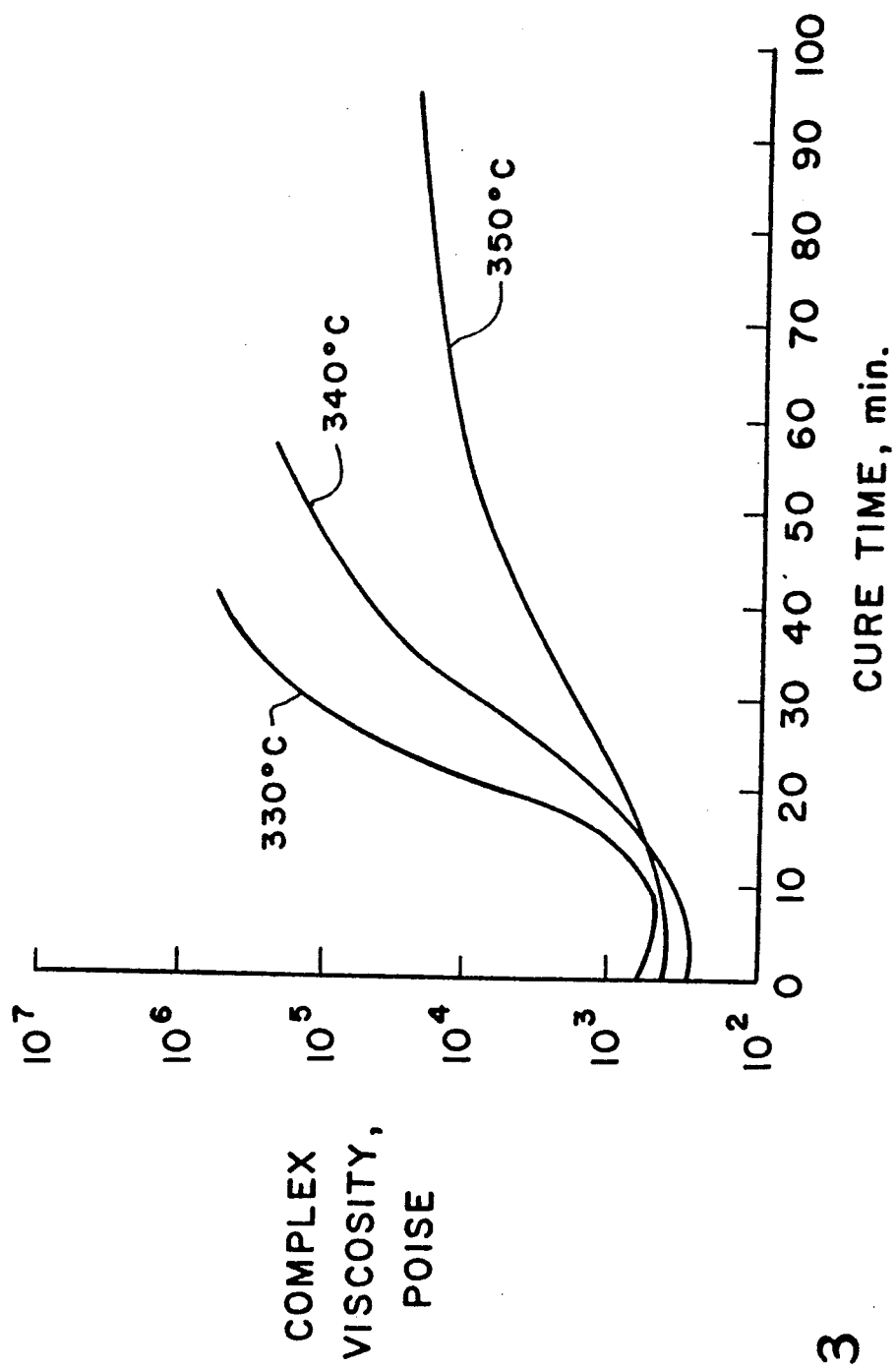
Figure 4:
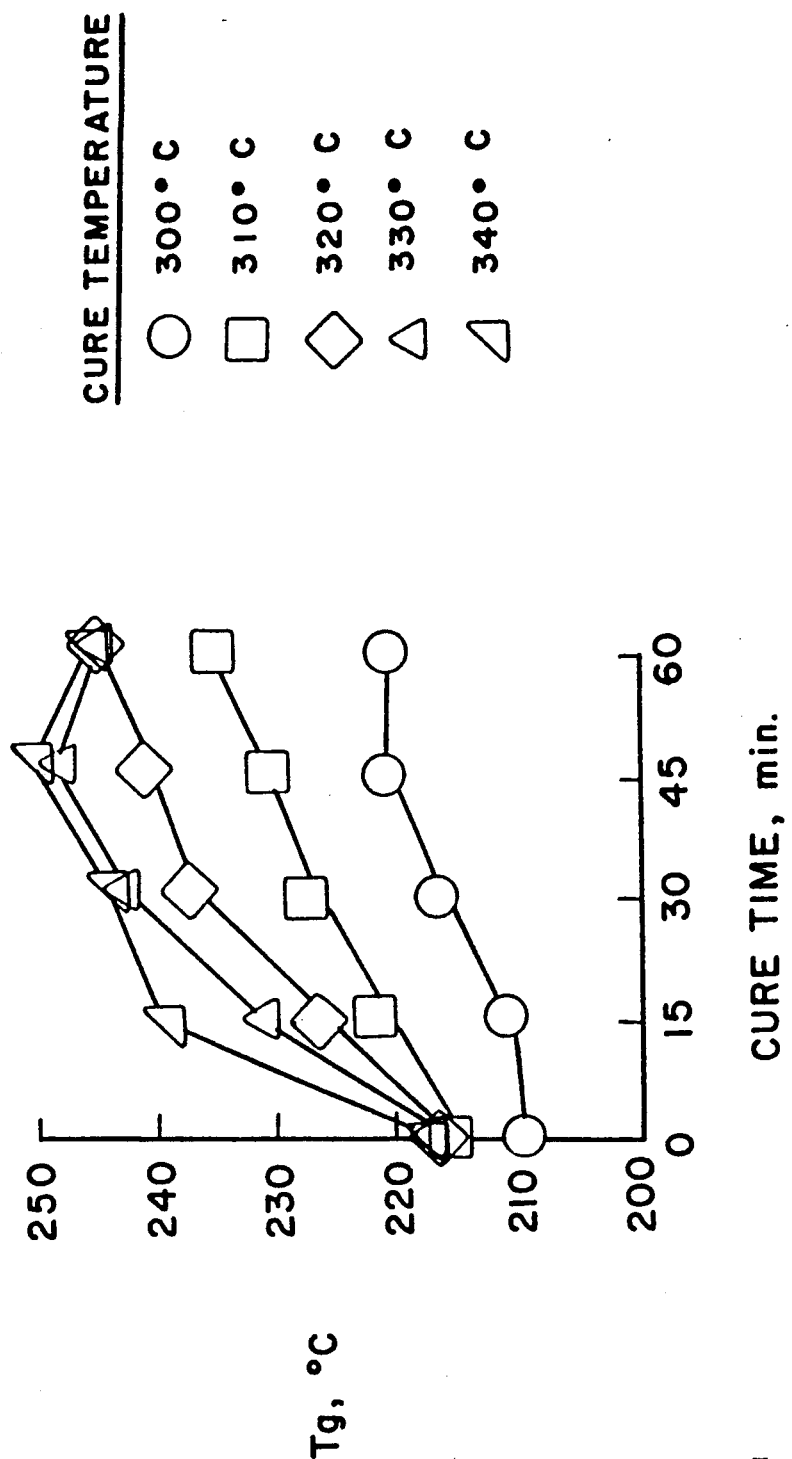
FIG. 4 is a plot of Tg vs cure time for the LARC-TPI polyimide powder.

The complex melt viscosity of the semicrystalline powder was measured in a Rheometrics System 4 melt rheometer at six temperatures as a function of time. The data are shown in FIGS. 2 and 3. The initial complex viscosity was below 10$^4$ poise at temperatures of 320° C. and higher. The viscosity increased sharply with time, indicating slow chain growth to higher molecular weight. The Tg of the powder also increased with time at temperatures as shown in FIG. 4. A maximum Tg of 250° C. was obtained by thermal exposure.

Figure 5:
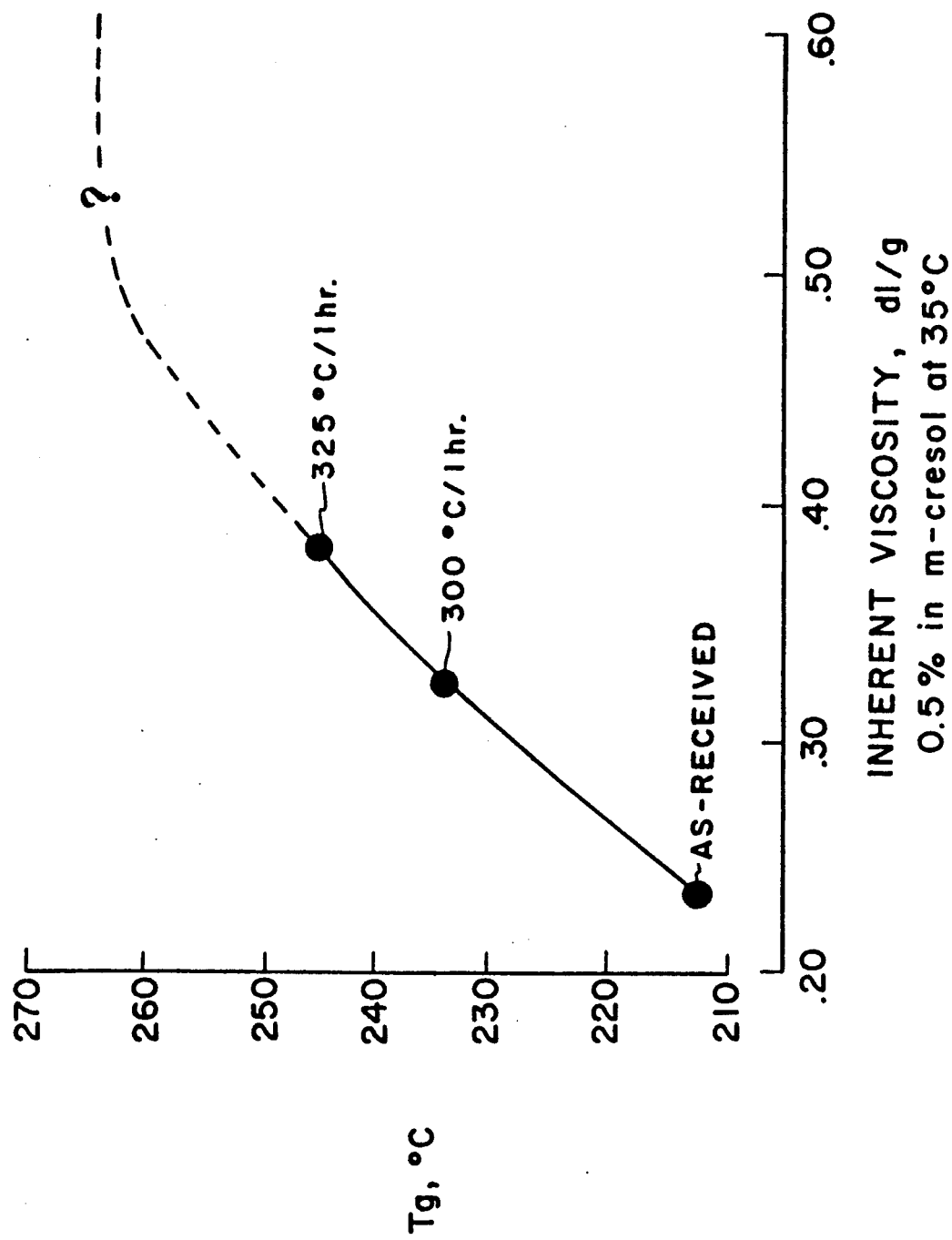
FIG. 5 is a plot of Tg vs inherent viscosity for the LARC-TPI polyimide powder.

The powder was thermally exposed to several time/-temperature profiles, its Tg then measured by DSC, and its inherent viscosity taken in m-cresol at 0.5 percent at 35° C. A plot of Tg versus inherent viscosity is shown in FIG. 5. The rather linear increase in viscosity and Tg with thermal exposure indicates slow step growth polymerization. The low Tg of the unexposed powder indicates that the material has a reasonably low molecular weight.

Figure 6:
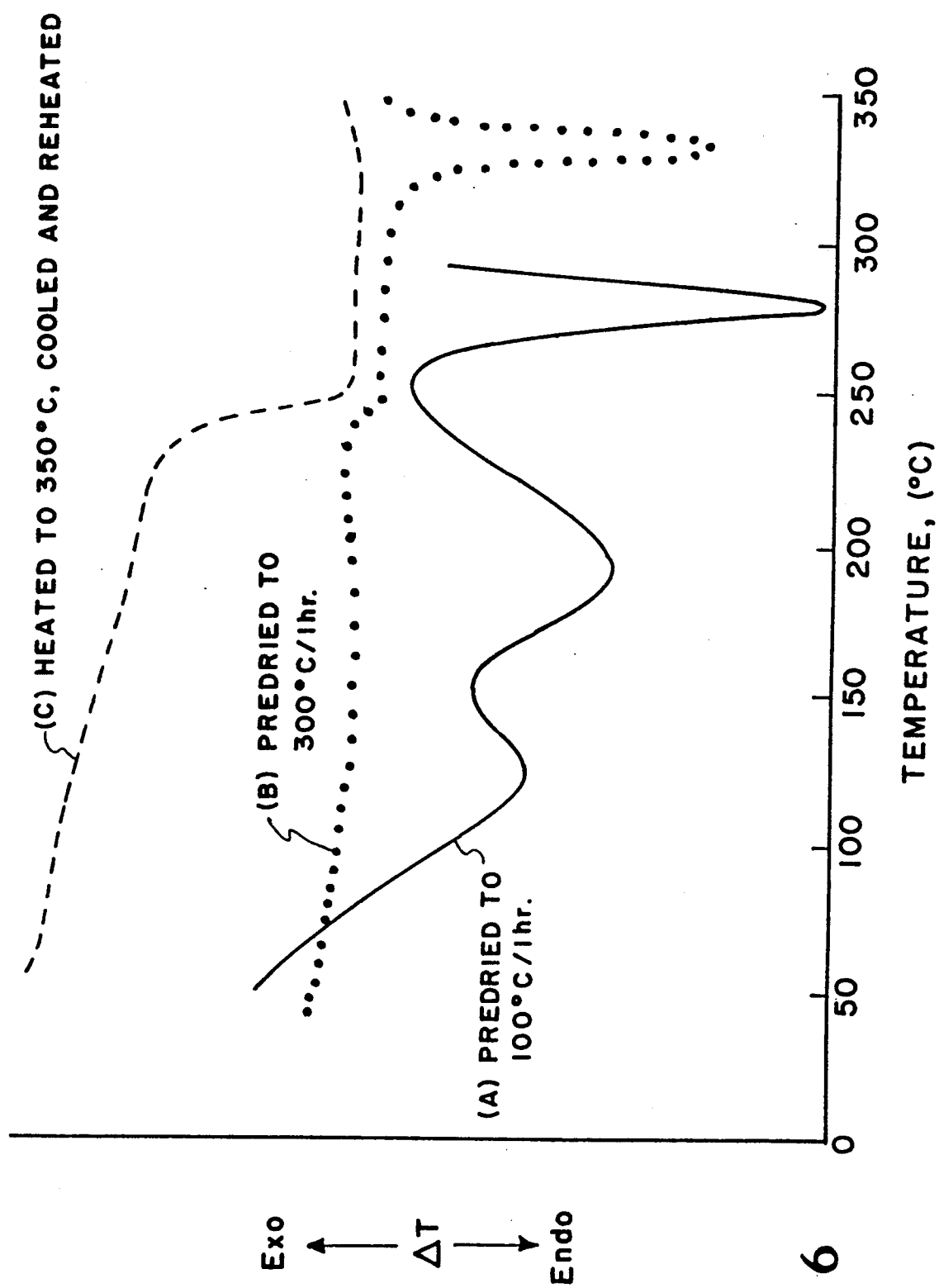
FIG. 6 shows DSC curves of a thin film formed from a 2:1 combination of the LARC-TPI polyimide powder and polyamic acid.

A 29.4 percent solution of 500g of polyamic acid (PAA) made in diglyme was diluted with 500g diglyme. LARC-TPI semicrystalline powder (294g) was added with stirring to make a 34 percent (w/w) solids content slurry containing a 2:1 ratio of PI:PAA. The slurry did not separate into solid and liquid phases after storage at ambient conditions for three months. The slurry was used to cast thin films, which when dried at 100° C./one hour, formed small flakes. DSC curves of this material are shown in FIG. 6. Curves A and B are similar to those observed in FIG. 1, except the Tg was higher in curve B due to the longer predry time at 300° C. The melt flow number and the corresponding melt viscosity from parallel plate viscometry measurements were obtained on the slurry powders dried to 220° C. Data presented in Table III shows that the 2:1 PI:PAA powder had about five times the flow of the undoped LARC-TPI.

TABLE III

| MELT FLOW DATA FOR POLYIMIDE POWDERS* | | | |
|---|---|---|---|
| Number | Composition | Flow Number** | Melt Viscosity, Poise*** |
| 1 | LARC-TPI PI powder: LARC-TPI PAA (2:1) | 58 | 2.9 × 10$^6$ |
| 2 | LARC-TPI PI powder: LARC-TPI PAA (1:1) | 41 | 4.4 × 10$^6$ |
| 3 | LARC-TPI PI powder: LARC-TPI PAA (1:2) | 27 | 5.2 × 10$^6$ |
| 4 | LARC-TPI | 11 | 13.2 × 10$^6$ |
| 5 | LARC-TPI PI powder: PISO$_2$ PAA (2:1) | 87 | 2.9 × 10$^4$ |
| 6 | LARC-TPI PI powder: PISO$_2$ PAA (1:1) | 61 | 4.2 × 10$^4$ |
| 7 | LARC-TPI PI powder: PISO$_2$ PAA (1:2) | 46 | 5.1 × 10$^4$ |
| 8 | PISO$_2$ | 40 | 7.8 × 10$^4$ |

*Parallel plate plastometer, 351° C., 171 psi; powders dried at 220° C. for 12 hours
**Military Spec. MIL-P-1394F; NEMA Spec. LI-1-14.32 using parallel plate plastometer
***Calculated from parallel plate plastometer flow data using Voigt model A continuous carbon fiber prepreg was prepared by passing 12,000 filament unsized AS-4 tow through a dip tank containing the slurry. The tow was wound onto a drum and dried. Resin content was controlled by the slit size of a die attached to the exit side of the dip tank. The prepreg could also be prepared by brushing the slurry onto dry fiber, tow, or fabric. Drawings made from scanning electron micrographs of the edge and top surface of a typical dried prepreg are shown in FIGS. 7A–7D. These micrographs show the homogeneous distribution of the 2–4 micron diameter particles along the longitudinal axis of the fibers.

Composites were prepared from this prepreg by the schedule shown in the following Table IV.

TABLE IV

COMPOSITE PROCESSING CONDITIONS

Predry prepreg   218° C. (425° F.)/one hour for LARC-TPI;
                      288° C. (550° F.)/one hour for $PISO_2$
Stack piles in closed mold; no bleeder cloth needed
Apply   300 psi cold for LARC-TPI;
          500 psi cold for $PISO_2$
Heat at 5°–7° C. (10°–15° F.)/min to 350° C. (662° F.)
Hold  one hour for LARC-TPI;
        fifteen minutes for $PISO_2$
Cool These composites exhibited excellent consolidation, high Tg values, and good ultrasonic C-scans taken under test conditions which would detect microvoids in carbon fiber-epoxy composites. The short beam shear and flexural properties are shown in Table V below. The high values both at room and elevated temperature are to be contrasted with the lower values shown in Table I for the undoped LARC-TPI resin.

TABLE V

SHORT BEAM SHEAR AND FLEXURE PROPERTIES OF AS-4/LARC-TPI PI:PAA COMPOSITES*

| Test temp., °C. (°F.) | SBS St., Ksi | Flex. St., Ksi | Flex. Mod., Msi |
|---|---|---|---|
| LARC-TPI PI:PAA (2:1) | | | |
| RT | 13.8 | 285 | 14.1 |
| 93 (200) | 12.6 | 254 | 14.1 |
| 149 (300) | 10.6 | 232 | 13.1 |
| 177 (500) | — | 199 | 13.3 |
| LARC-TPI PI:PAA (1:1) | | | |
| RT | 14.4 | 289 | 13.8 |
| 93 (200) | 13.1 | — | — |
| 149 (300) | 10.9 | — | — |
| 160 (500) | — | 196 | 14.1 |
| 177 (350) | — | 158 | 6.6 |
| LARC-TPI PI:PAA (1:2) | | | |
| RT | 14.7 | 277 | 14.3 |
| 149 (300) | 10.3 | 174 | 13.2 |
| 177 (350) | 10.5 | — | — |

*45–52% fiber vol.; Tg 244–261° C.; C-scans good

DSC curves for a 4-ply unidirectional composite are shown in FIG. 8. In-plane shear properties are shown in the following Table VI.

TABLE VI

IN-PLANE SHEAR PROPERTIES FOR AS-4/LARC-TPI PI:PAA (2:1) COMPOSITE

| Test temp., °C. (°F.) | Shear Stress, $\tau_{12}$, Ksi | Shear Modulus, $G_{12}$, Msi |
|---|---|---|
| RT | 16.2 | 0.80 |
| 93 (200) | 16.5 | 0.78 |
| 149 (300) | 14.5 | 0.69 |
| 205 (400) | 9.4 | 0.78 |

Fracture toughness properties given in Table VII below indicate that the polymer matrix is a very tough material, in contrast to values for brittle materials which range from 50 to 200 $J/m^2$.

TABLE VII

FRACTURE TOUGHNESS PROPERTIES FOR AS-4/(O)$_{24}$ COMPOSITES

| Resin | $G_{Ic}$ Initiation* | | $G_{Ic}$ Propagation | |
|---|---|---|---|---|
|  | $J/M^2$ | (in.-lb/in.$^2$) | $J/M^2$ | (in.-lb/in.$^2$) |
| LARC-TPI PI:PAA (2:1) | 838 | (4.8) | 1978 | (11.3)** |
| $PISO_2$:LARC-TPI (2:1) | 1232 | (7.0) | 1654 | (9.4)*** |

*First crack from crack starter
**One specimen: average of 9 cracks after first crack; 48% fiber vol., Tg 251° C.
***One specimen: average of 5 cracks after first crack; 53% fiber vol., Tg 243° C.

Example 2

To a 14.7 percent (w/w) LARC-TPI polyamic acid solution (1100g) in diglyme was added 162g of LARC-TPI semicrystalline polyimide powder. The resultant stable slurry had a 26 percent (w/w) solids content containing a 1:1 ratio of PI:PAA. The dried slurry exhibited DSC curves similar to those observed for the 2:1 PI:PAA slurry discussed in Example 1 and shown in FIG. 6. It had a melt flow number and viscosity (Table III) 3–4 times that of the undoped LARC-TPI powder made by thermal conversion of the polyamic acid.

The stable slurry was used to drum wind AS-4 prepreg which was fabricated into unidirectional composites according to the schedule given in Table V above. The composites had high Tg values, excellent consolidation, and were void-free as indicated by good C-scans. Short beam shear and flexure properties are shown in Table V. High values were obtained both at room and elevated temperature.

Example 3

To a 14.7 percent (w/w) LARC-TPI polyamic acid solution (1237g) in diglyme was added 118g of LARC-TPI semicrystalline polyimide powder. The resultant stable slurry had a 26 percent (w/w) solids content containing a 1:2 ratio of PI:PAA. The dried slurry exhibited DSC curves similar to those observed for the slurry disclosed in Example 1 and shown in FIG. 6. It had a melt flow number and viscosity (Table III) 2–3 times that of the undoped LARC-TPI.

Drum-wound AS-4 prepreg was made from this stable slurry and fabricated into unidirectional composites according to the schedule in Table IV above. The composites possessed high Tg values, exhibited excellent consolidation, and were void-free as indicated by good C-scans. High short beam shear and flexure properties (Table V) were obtained at both room and elevated temperature.

Example 4

Figure 9:
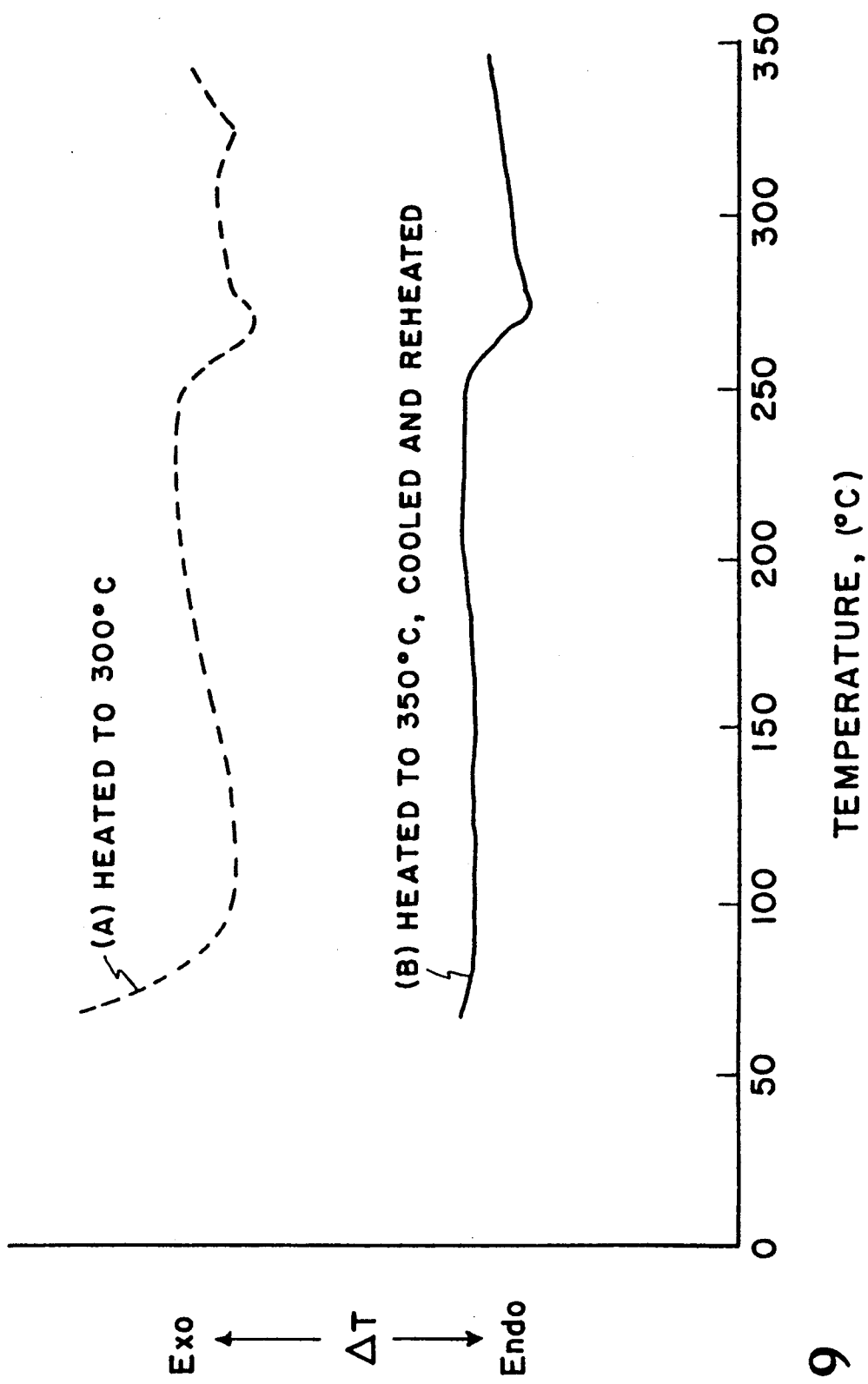
FIG. 9 shows DSC curves of a thin film formed from a 2:1 combination of polyimidesulfone ($PISO_2$) and the LARC-TPI polyimide powder.

An 18 percent (w/w) solution of polyimidesulfone ($PISO_2$) polyamic acid was prepared in diglyme by addition of one mole of solid BTDA with stirring to one mole of 3,3'-diaminodiphenylsulfone dissolved in 2600 ml diglyme. After complete dissolution of the powder, 2.0 g of phthalic anhydride was added as an endcapper. Inherent viscosity was 0.6±0.05 dl/g at 0.5 percent in DMAc at 35° C. To 1200 g of this solution was added 108 g of LARC-TPI semicrystalline polyimide powder with stirring to afford a 25 percent (w/w) solids content slurry containing a 2:1 ratio of $PISO_2$:LARC-TPI. The slurry was stable, and did not separate into its components on standing for long periods at ambient conditions. The slurry was cast into thin films, which when dried at 300° C. formed flakes. DSC curves of this material are shown in FIG. 9. Tg values above 250° C. were observed. Data in Table III shows that the 2:1 PI:PAA powder has a much lower melt viscosity than the undoped $PISO_2$.

Figure 10:
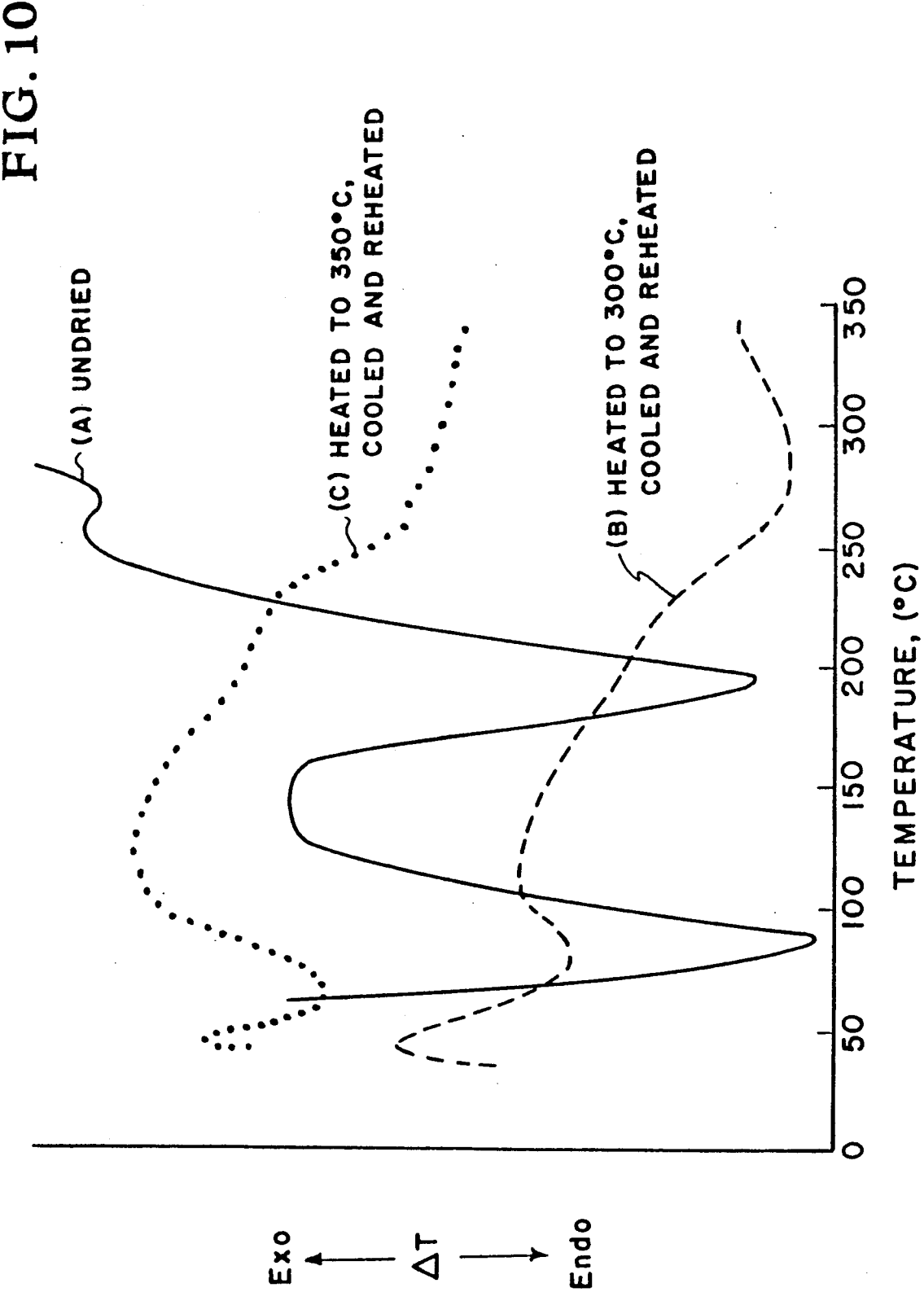
FIG. 10 shows DSC curves of a prepreg fabricated from a 2:1 slurry of polyimidesulfone ($PISO_2$) and the LARC-TPI polyimide powder.

Drum-wound AS-4 prepreg was made from this slurry. DSC curves for the prepreg at various stages of cure are shown in FIG. 10. Curve A, the undried material, showed strong endotherms centered at 90° C., 200° C., and 275° C., the first two due to water and solvent evolution, and the latter due to melt of the LARC-TPI semicrystalline powder. Curves B and C exhibit Tg endotherms at about 250° C.

Composites were fabricated from this prepreg according to the schedule shown in Table IV above. They possessed high Tg values, excellent consolidation, and were void-free as indicated by good C-scans. This was contrasted with composites made from the endcapped $PISO_2$ that contained no LARC-TPI semicrystalline powder. They were poorly consolidated and exhibited poor C-scans indicating presence of voids. Short beam shear and flexure properties of these composites are given in Table VIII below. High values were obtained both at room and elevated temperatures for the $PISO_2$ - LARC-TPI (2:1) composites, while the undoped $PISO_2$ composites exhibited lower strengths due to poor consolidation.

TABLE VIII

SHORT BEAM SHEAR AND FLEXURE PROPERTIES OF AS-4/$PISO_2$ COMPOSITES

| Test temp., °C. (°F.) | SBS St., Ksi | Flex. St., Ksi | Flex. Mod., Msi |
|---|---|---|---|
| $PISO_2$ Endcapped Unidirectional* | | | |
| RT | 9.8 | 277 | 17.1 |
| 177 (350) | 8.0 | 156 | 16.7 |
| $PISO_2$:LARC-TPI (2:1), Unidirectional** | | | |
| RT | 18.4 | 300 | 18.8 |
| 93 (200) | — | 239 | 14.5 |
| 149 (300) | 10.8 | 234 | 15.2 |
| 163 (325) | 11.1 | 214 | 14.5 |
| 177 (350) | 10.8 | — | — |
| 205 (400) | 8.9*** | — | — |
| $PISO_2$:LARC-TPI (2:1), (0/90)$_{2s}$ | | | |
| RT | — | 213 | 11.0 |
| 177 (350) | — | 177 | 9.0 |

*62% fiber vol.; Tg 257–259° C.; C-scan poor
**51–60% fiber vol.; Tg 251–258° C.; C-scan fair to good
***Nonlinear load deflection curve The present invention has been described in detail with respect to certain preferred embodiments thereof. However, as understood by those of skill in the art, variation and modification in this detail may be effected without any departure from the spirit and scope of the present invention, as defined in the hereto-appended claims.

What is claimed is:

1. A process for preparing a composite material, which process comprises blending an insoluble aromatic polyimide powder with an aromatic polyamic acid solution, said blending resulting in a slurry, said aromatic polyamic acid solution comprising a first aromatic polyamic acid dissolved in a solvent selected from the group consisting of aprotic solvents, protic solvents and ether solvents, wherein a ratio of said polyimide powder to said first polyamic acid is between 1:10 and 10:1 by weight, which process further comprises preparing a prepreg from substrate fibers and said slurry, by impregnating said substrate fibers with said slurry, which process further comprises removing said solvent from said prepreg, wherein said polyamic acid acts to bind said polyimide powder to said substrate fibers, and which process finally comprises consolidating said prepreg into a finished composite material by the addition of heat, wherein both said polyamic acid and said polyimide powder comprise a matrix for said finished composite.

2. The process according to claim 1, wherein the aromatic polyimide powder is prepared by the cyclodehydration of a second polyamic acid in a solvent selected from the group consisting of aprotic solvents, protic solvents and ether solvents, said aromatic polyimide powder having the following properties:

percent crystallinity: between 10 and 50 percent;
   melting point: in the range from 100° C. to 350° C.;
   number average molecular weight: between 5,000 and 50,000 grams/mole;
   inherent viscosity: 0.1 to 1.0 dl/g in dimethylacetamide or m-cresol;
   melt viscosity: $10^2$ to $10^4$ poise at 300 to 350° C.;
   capable of step-growth polymerization to a high molecular weight polymer;
   exhibiting no crystallinity after thermal exposure above 325° C.; and particle size: less than the diameter of the substrate fibers.

3. The process according to claim 2, wherein the first aromatic polyamic acid and the second aromatic polyamic acid are both aromatic polyamic acids having the structural formula:

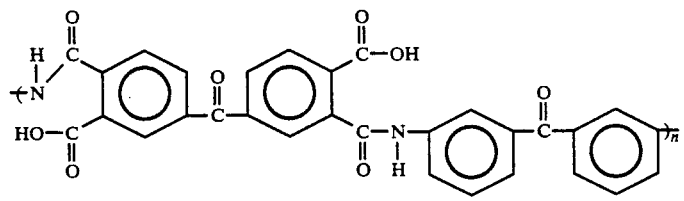

wherein n is greater than 5.

4. The process according to claim 2, wherein the first aromatic polyamic acid is an aromatic polyamic acid having the structural formula:

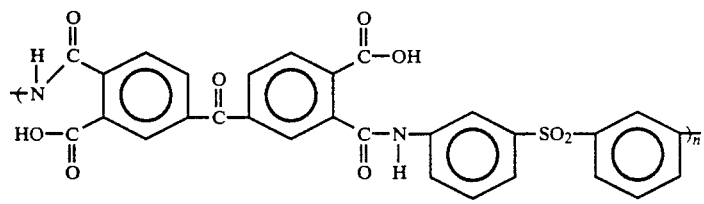
wherein n is greater than 5, and
wherein the second aromatic polyamic acid is an aromatic polyamic acid having the structural formula:
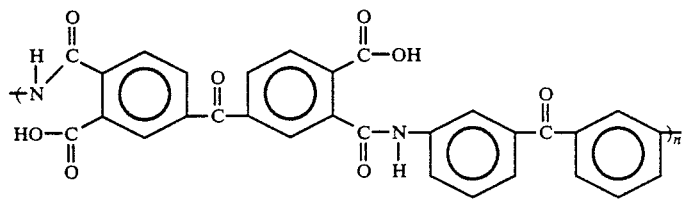
wherein n is greater than 5.
* * * * *